United States Patent
Lennen

(10) Patent No.: US 10,094,931 B2
(45) Date of Patent: Oct. 9, 2018

(54) DETECTION OF, AND PROCESSING OF SIGNALS WITHIN A NULL ZONE BY A GLOBAL NAVIGATION SATELLITE SYSTEM RECEIVER

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd (KR)

( * ) Notice: Subject to any disclaimer, the term of this patent is extended or adjusted under 35 U.S.C. 154(b) by 322 days.

(21) Appl. No.: 15/159,453

(22) Filed: May 19, 2016

(65) Prior Publication Data

US 2017/0242128 A1 Aug. 24, 2017

Related U.S. Application Data

(60) Provisional application No. 62/298,659, filed on Feb. 23, 2016.

(51) Int. Cl.
*G01S 19/23* (2010.01)
*G01S 19/09* (2010.01)
*G01S 19/34* (2010.01)

(52) U.S. Cl.
CPC .................... *G01S 19/23* (2013.01)

(58) Field of Classification Search
CPC ............................ G01S 19/23; G01S 19/235
USPC ............ 342/357.4, 357.46, 357.61, 357.62, 342/357.74; 701/468, 478.5, 479, 490
See application file for complete search history.

(56) References Cited

U.S. PATENT DOCUMENTS

| | | | |
|---|---|---|---|
| 5,081,462 A | 1/1992 | Tachita | |
| 5,678,169 A | 10/1997 | Tumey | |
| 5,808,582 A * | 9/1998 | Woo | G01S 19/22 342/357.61 |
| 6,002,364 A | 12/1999 | Kroeger et al. | |

(Continued)

FOREIGN PATENT DOCUMENTS

| | | |
|---|---|---|
| CN | 101424733 | 5/2009 |
| WO | WO 2005040845 | 5/2005 |
| WO | WO 2015126499 | 8/2015 |

*Primary Examiner* — Dao L Phan
(74) *Attorney, Agent, or Firm* — The Farrell Law Firm, P.C.

(57) ABSTRACT

Apparatuses, systems, and methods for mitigating the effects of null zones on the measurements of Global Navigation Satellite System (GNSS) receivers are described. In one aspect, a GNSS receiver calculates both a filtered value of an integrated and summed value for a punctual correlator of a satellite signal ("the calculated filtered punctual correlator value") and an average of integrated and summed correlator values for a plurality of noise/offset correlators of the satellite signal ("the calculated average noise/offset correlator value"). The GNSS receiver then calculates a signal energy loss parameter $E_{SL}$ of the satellite signal using the calculated filtered punctual correlator value and the calculated average noise/offset correlator value and processes the satellite signal measurement based at least on the signal energy loss parameter $E_{SL}$ and a predetermined threshold $Th_{SL}$ presently corresponding to the punctual and noise/offset correlators of the satellite signal.

20 Claims, 11 Drawing Sheets

(56) References Cited

U.S. PATENT DOCUMENTS

| | | |
|---|---|---|
| 6,456,233 B1 | 9/2002 | Zhodzishky et al. |
| 6,466,612 B2 | 10/2002 | Kohli et al. |
| 6,643,320 B1 | 11/2003 | Wilcox et al. |
| 2009/0010239 A1 | 1/2009 | Yeh et al. |
| 2009/0054075 A1 | 2/2009 | Boejer et al. |
| 2010/0127930 A1 | 5/2010 | Nelson |
| 2011/0109506 A1 | 5/2011 | Humphreys et al. |
| 2012/0114022 A1 | 5/2012 | Lever et al. |
| 2013/0050018 A1 | 2/2013 | Jeong et al. |
| 2015/0042511 A1 | 2/2015 | Miller et al. |

\* cited by examiner

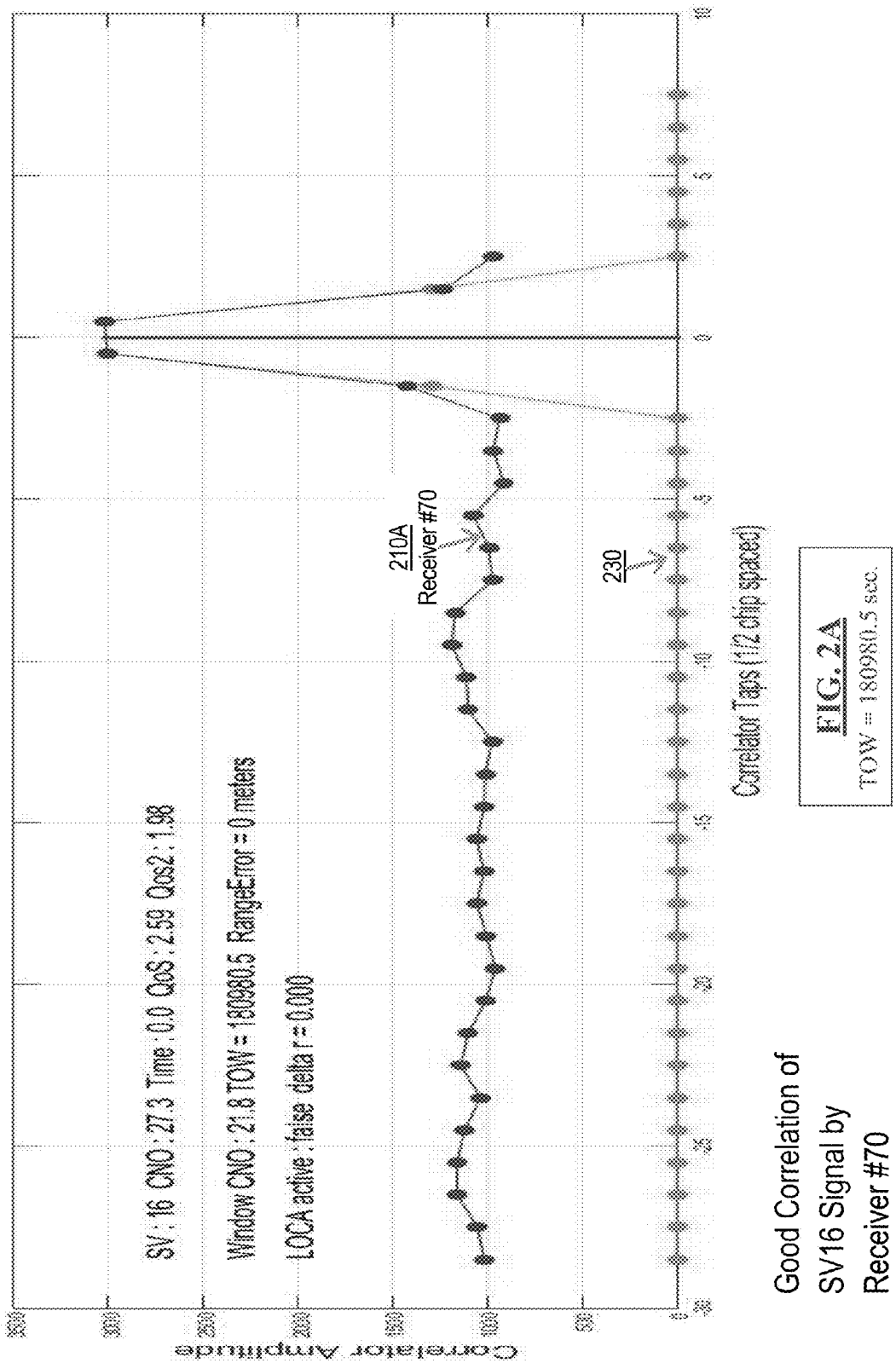

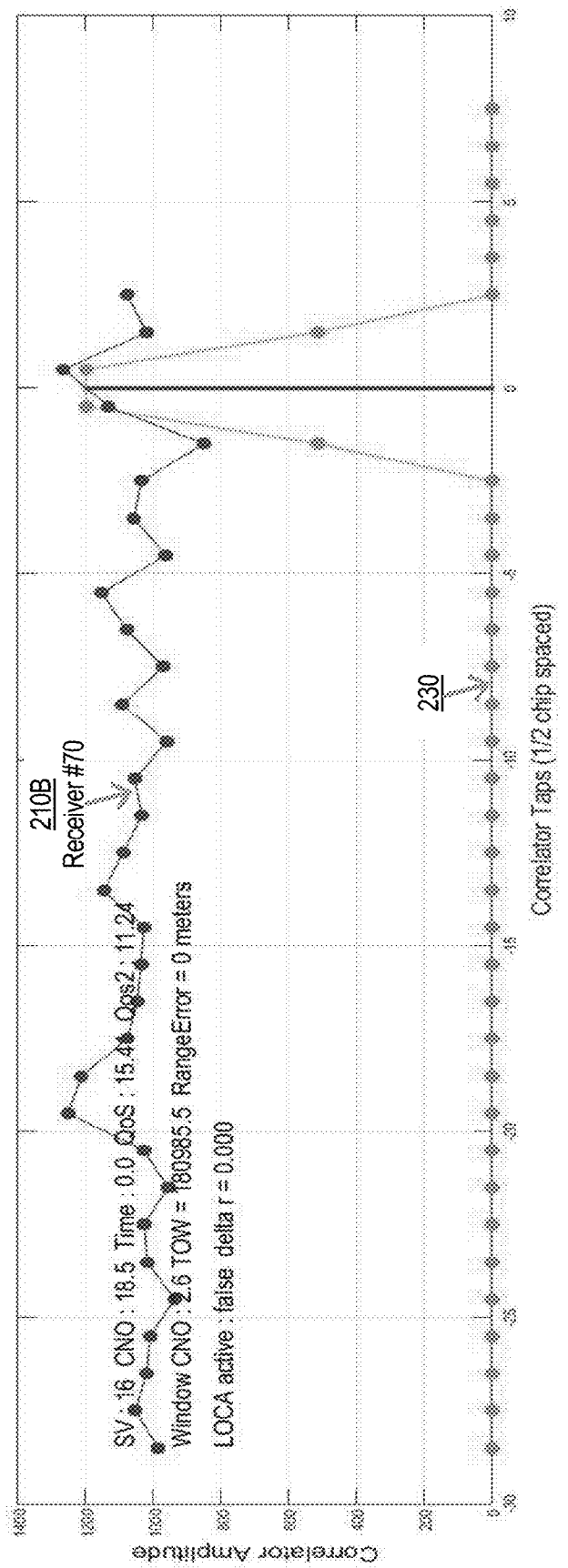

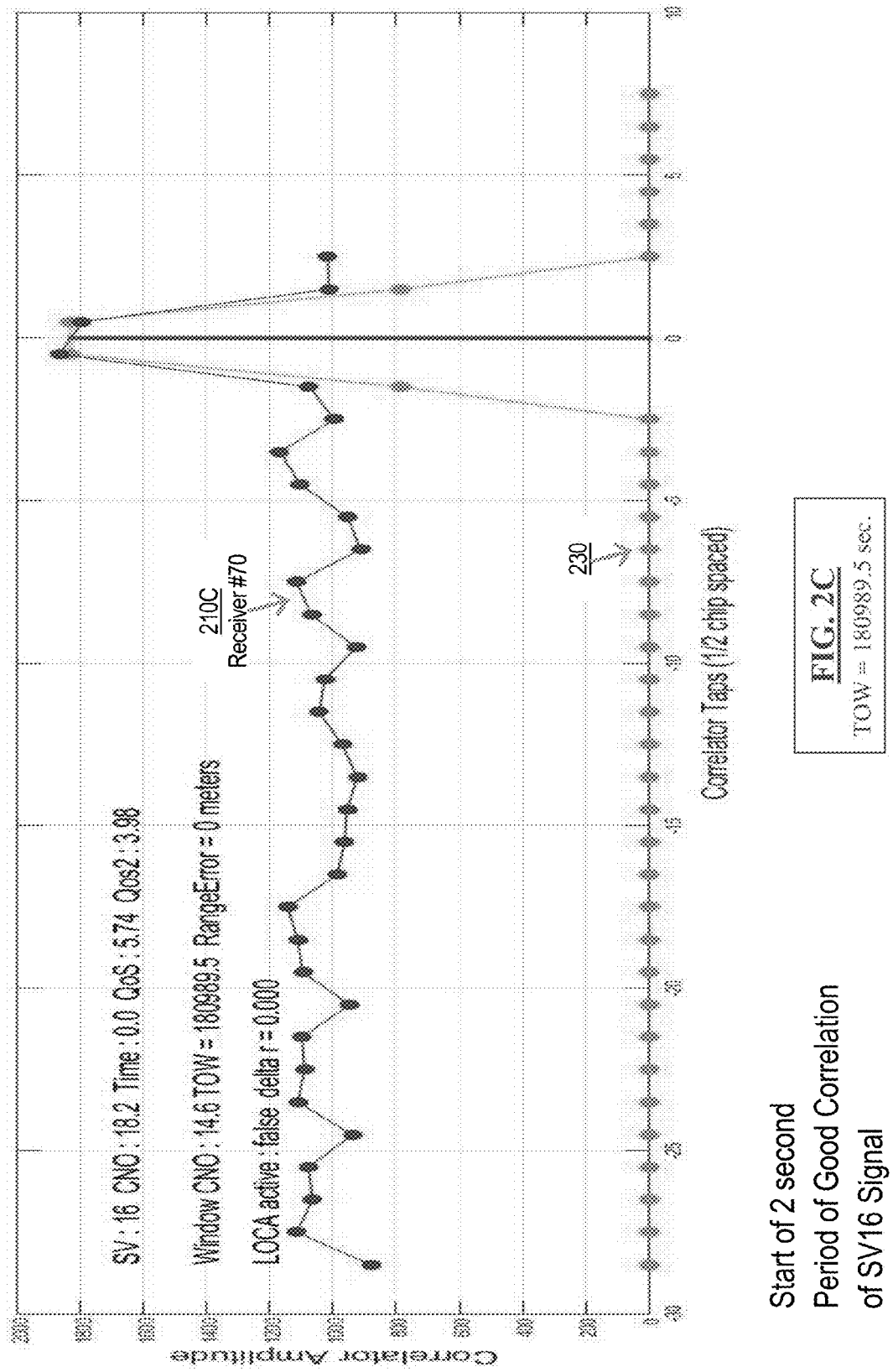

TOW = 181000.5 sec.

Correlation of SV16 Signal by Receiver #70 is Bad Throughout Tunnel

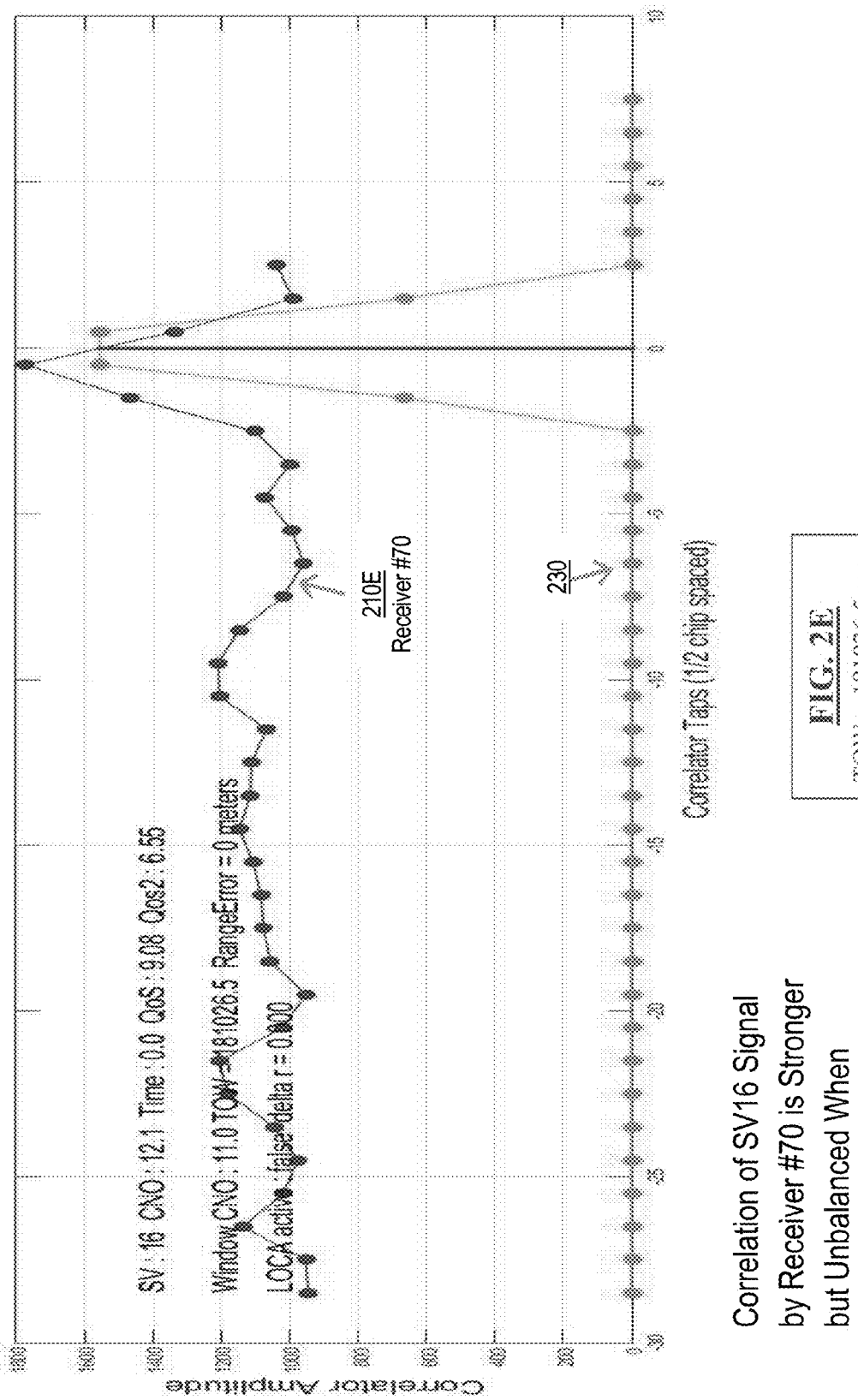

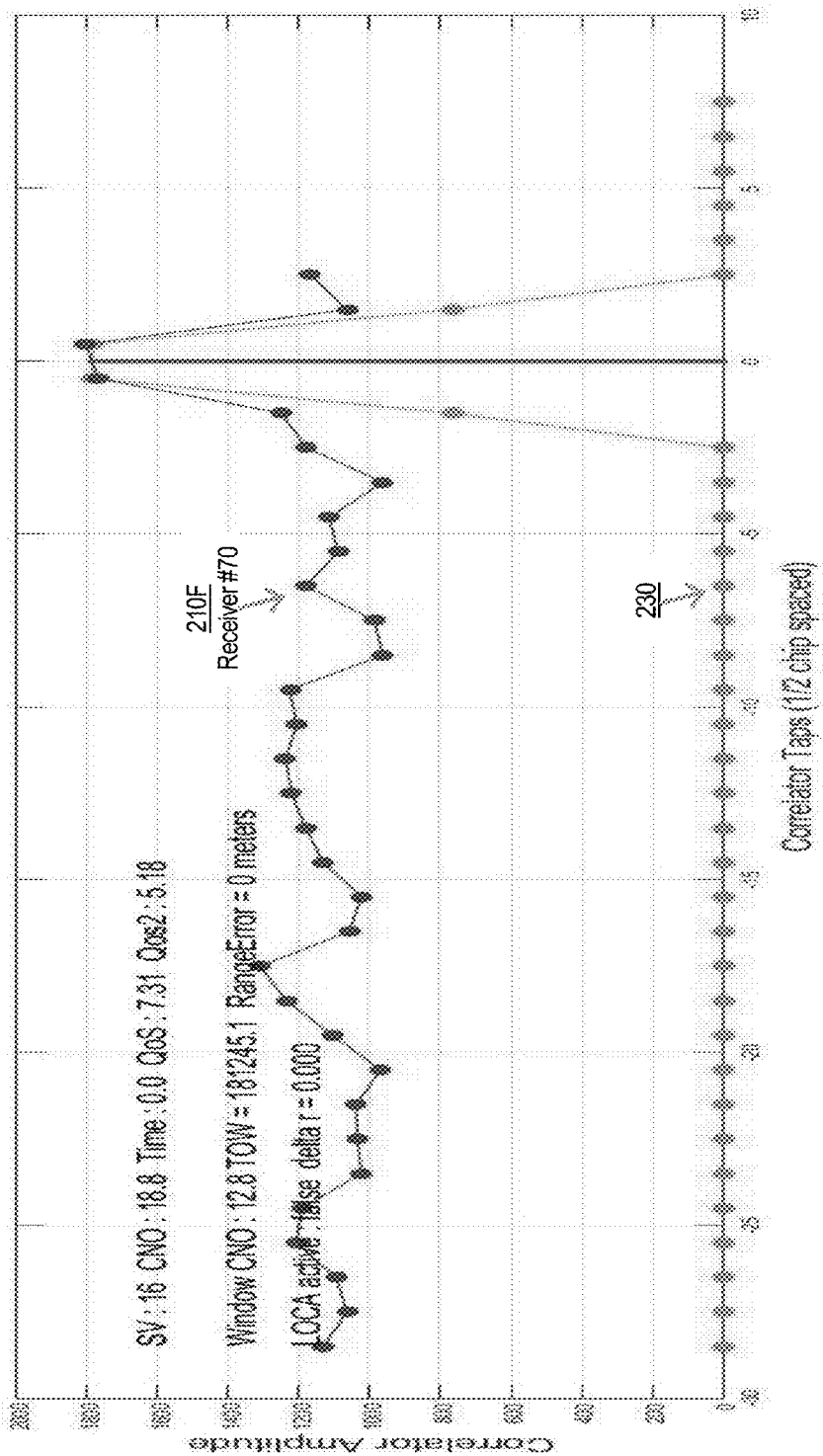

DETECTION OF, AND PROCESSING OF SIGNALS WITHIN A NULL ZONE BY A GLOBAL NAVIGATION SATELLITE SYSTEM RECEIVER

PRIORITY

This application claims priority under 35 U.S.C. § 119(e) to a U.S. Provisional patent application filed on Feb. 23, 2016 in the United States Patent and Trademark Office and assigned Ser. No. 62/298,659, the entire contents of which are incorporated herein by reference.

FIELD

The present disclosure relates generally to Global Navigation Satellite System (GNSS) receivers, and more particularly, to a system and method for detection of, and processing of signals within a null zone by a GNSS receiver.

BACKGROUND

Satellite navigational systems provide positional and timing information to earth-bound receivers. Each system has its own constellation of satellites orbiting the Earth, and, in order to calculate its position, a receiver on Earth uses the satellites "in view" (i.e., in the sky above) from that system's constellation. Global Navigational Satellite System (GNSS) is often used as the generic term for such a system, even though such navigational satellite systems include regional and augmented systems—i.e., systems that are not truly "global." The term "GNSS," as used herein, covers any type of navigational satellite system, global, regional, augmented or otherwise, unless expressly indicated otherwise.

The number of GNSS systems, both planned and presently operational, is growing. The widely-known, widely-used, and truly global Global Positioning System (GPS) of the United States has been joined by other global systems: Russia's GLObalnaya NAvigatsionnaya Sputnikovaya Sistema (GLONASS), Europe's Galileo system, and China's BeiDou system—each of which has, or will have, its own constellation of satellites orbiting the globe. Regional systems (those that are not global, but intended to cover only a certain region of the globe) include Japan's Quasi-Zenith Satellite System (QZSS) and the Indian Regional Navigational Satellite System (IRNSS) currently being developed. Augmented systems are normally regional as well, and "augment" existing GNSS systems with, e.g., messages from ground-based stations and/or additional navigational aids. These include the Wide Area Augmentation System (WAAS), European Geostationary Navigation Overlay Service (EGNOS), Multi-functional Satellite Augmentation System (MSAS), and GPS Aided Geo Augmented Navigation (GAGAN). Regional GNSS systems, such as QZSS, can also operate as augmented systems.

A GNSS receiver may be implemented in a mobile terminal, a tablet computer, a camera, a portable music player, and a myriad of other portable and/or mobile personal consumer devices, as well as integrated into larger devices and/or systems, such as the electronics of a vehicle. The term "GNSS receiver" as used herein, covers any such implementation of GNSS capabilities in a device or system.

Broadly speaking, the reception/processing of GNSS signals involves three phases: acquisition, tracking, and positional calculation (producing a "navigation solution" or "position solution"). Acquisition is the acquiring or identifying of the current satellites in view (SVs), which means satellites that are "visible" overhead, i.e., the satellites from which the GNSS receiver can receive signals. Acquisition can be understood as "finding" the SVs, while tracking is the fine tuning of the signals received from the acquired SVs and keeping track of the acquired SVs over time. Once acquired and adequately tracked, the SV's signals are processed to extract the navigational, positional, timing, and other data transmitted in each SV's signal, and the data from all the SV's being tracked is then used to calculate the GNSS receiver's position. Of course, there are further complexities to the actual reception and processing of GNSS signals, such as various loops feeding back information between these phases for further correction and adjustment of data, as is known to one of ordinary skill in the art.

However, there are times when most or all of the satellites overhead are completely blocked and/or only weakened versions of their signals reach the GNSS receiver, such as when the GNSS receiver is travelling through a tunnel. This is referred to, among other things, as being "offline" or in a "dead zone", "null zone", or "signal null". Signal nulling may be long and expected, such as the GNSS receiver entering a tunnel, or for short unexpected periods.

Sometimes GNSS signals from specific satellites continue to be tracked while in a null zone, and these GNSS signals lead to bad measurements that are used in position fixing when the GNSS receiver exits the null zone. This is due to insufficient satellite signal strength to maintain a substantially aligned signal track, in terms of automatic frequency control (AFC) carrier tracking and code loop tracking—i.e., the signal energy available for tracking drops below the amount required to maintain substantial alignment with incoming satellite signals. When receiving too few and/or too weak GNSS signals while in a dead zone, the tracking loops are driven in large part by random noise formed by the noise floor of the GNSS receiver, thereby causing the signal tracking to drift randomly. Because the GNSS receiver continues to provide measurements to the navigation engine, large measurement errors (e.g., in position) are observed.

SUMMARY

Accordingly, the present disclosure has been made to address at least the problems and/or disadvantages described above and to provide at least the advantages described below.

According to an aspect of the present disclosure, a method for a Global Navigation Satellite System (GNSS) receiver is provided, including calculating a filtered value of an integrated and summed correlator value for a punctual correlator of a satellite signal ("the calculated filtered punctual correlator value"); calculating an average of integrated and summed correlator values for a plurality of noise/offset correlators of the satellite signal ("the calculated average noise/offset correlator value"); calculating a signal energy loss parameter $E_{SL}$ of the satellite signal using the calculated filtered punctual correlator value and the calculated average noise/offset correlator value; and processing the satellite signal measurement based at least on the signal energy loss parameter $E_{SL}$ and a predetermined threshold $Th_{SL}$ presently corresponding to the punctual and noise/offset correlators of the satellite signal.

According to another aspect of the present disclosure, a Global Navigation Satellite System (GNSS) receiver is provided, including a plurality of correlators; at least one non-transitory computer-readable medium; and at least one processor, which, when executing instructions stored on one or more of the at least one non-transitory computer-readable medium, has the GNSS receiver perform at least the following steps: calculating a filtered value of an integrated and summed correlator value for a punctual correlator of a satellite signal ("the calculated filtered punctual correlator value"); calculating an average of integrated and summed correlator values for a plurality of noise/offset correlators of the satellite signal ("the calculated average noise/offset correlator value"); calculating a signal energy loss parameter $E_{SL}$ of the satellite signal using the calculated filtered punctual correlator value and the calculated average noise/offset correlator value; and processing the satellite signal measurement based at least on the signal energy loss parameter $E_{SL}$ and a predetermined threshold $Th_{SL}$ presently corresponding to the punctual and noise/offset correlators of the satellite signal.

According to another aspect of the present disclosure, a modem chip capable of processing Global Navigation Satellite System (GNSS) signals is provided, including a plurality of correlators; at least one non-transitory computer-readable medium; and at least one processor, which, when executing instructions stored on one or more of the at least one non-transitory computer-readable medium, has the modem chip perform at least the following steps: calculating a filtered value of an integrated and summed correlator value for a punctual correlator of a satellite signal ("the calculated filtered punctual correlator value"); calculating an average of integrated and summed correlator values for a plurality of noise/offset correlators of the satellite signal ("the calculated average noise/offset correlator value"); calculating a signal energy loss parameter $E_{SL}$ of the satellite signal using the calculated filtered punctual correlator value and the calculated average noise/offset correlator value; and processing the satellite signal measurement based at least on the signal energy loss parameter $E_{SL}$ and a predetermined threshold $Th_{SL}$ presently corresponding to the punctual and noise/offset correlators of the satellite signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 2A through 2F show the correlation amplitude of the SV16 signal received by Receiver #70 measured at specific moments in time in the graph of FIG. 1, to which an embodiment of the present disclosure is applied;

DETAILED DESCRIPTION

Figure 1:
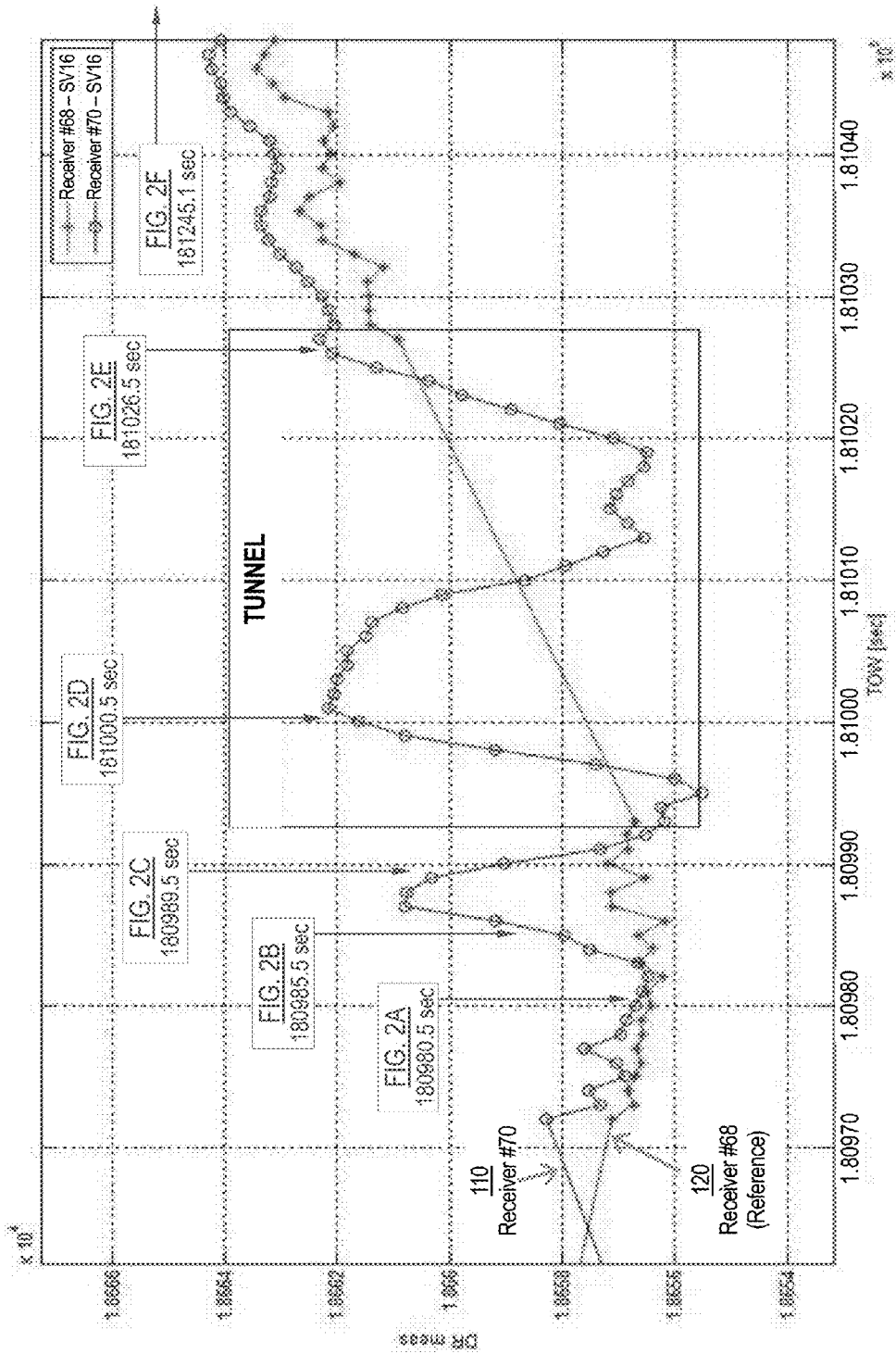
FIG. 1 is a graph of delta range measurement error over time of the same satellite signal as received by a GPS receiver as compared to a reference signal before, during, and after entering a tunnel, to which embodiments of the present disclosure are applied.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may comprise one or more elements. An element may comprise any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in this specification are not necessarily all referring to the same embodiment.

According to embodiments of the present disclosure, the received GNSS signal energy is measured in such a way as to provide timely information with respect to possible signal drift and the consequent errors in measurements and navigation solutions. A new short term estimate of whether there is enough signal to noise ratio (SNR) present to successfully drive the tracking loops in the right direction (i.e., maintaining substantial alignment with the incoming satellite) is used to shape and/or eliminate questionable measurements.

As mentioned above, in dead/null zones, there is insufficient satellite signal strength to maintain substantial alignment with incoming satellite signals. An example of this is shown in reference to FIG. 1.

FIG. 1 is a graph of error over time of the same satellite signal as received by two different GPS receivers before, during, and after entering a tunnel. More specifically, line 110, having circle-shaped marks indicating discrete measurements, represents the signal of satellite SV16 as received by GPS receiver #70, while line 120, having plus-shaped marks, represents the signal of satellite SV16 as received by GPS receiver #68. In FIG. 1, receiver #70 is the test, while receiver #68 represents the reference signal. The y-axis of FIG. 1 ("DR meas") is the delta range measurement, while the x-axis represents time ("TOW"), the space between each dotted line being ten seconds. The time is measured as the time of week (TOW), which is the GPS-based time frame, reset to zero at the beginning of every week.

As shown by the peak in line 110 at around TOW=180987 in FIG. 1, receiver #70's reception of the SV16 signal goes out of alignment even before entering the tunnel. When in the tunnel, swings between extremes of being out of alignment, before coming reasonably close (and parallel) to alignment after exiting the tunnel.

FIG. 1 illustrates the general conclusions which can be reached regarding the phenomena of signal nulls. The GNSS receiver continues to output measurements (as shown by the circles in line 110) even while no significant satellite correlation is observed. Moreover, it takes a few seconds (based on the bandwidths of the tracking loops) for the measurements to start to diverge from the reference. Further still, the problem is unrelated to changing noise conditions at the receiver.

According to an embodiment of the present disclosure, instead of the standard carrier to noise density power ratio ($C/N_0$) measurement indicators used by many GNSS receivers, a combination of window-based $C/N_0$ and past knowledge of tracking loop bandwidths is used as a metric for observing measurement quality. Such a metric may be used as a binary decision or weighting metric by the navigation engine. As shown by FIG. 1, a weighting metric may be more useful because alignment/correlation energy comes and goes and a weighting metric can be useful as the alignment/correlation energy moves (even for short periods of time).

FIGS. 2A through 2F show the measured correlation amplitude at specific moments in time, where those specific moments in time are indicated by the boxes in FIG. 1. Moreover, FIGS. 2A through 2F provide the standard $C/N_0$ measurement indicator ("CNO") along with windowed $C/N_0$ measurement indicator according to an embodiment of the present disclosure ("Window CNO"). As shown therein, the Window CNO indicator according to an embodiment of the present disclosure provides a much better indicator than the standard CNO, and the two indicators often differ in value by as much as 10 dB or more. In each of FIGS. 2A through 2F, line 230 indicates the reference correlation amplitude—i.e., under the ideal situation where no noise is present.

The correlation amplitude 210A of the SV16 signal received by receiver #70 at TOW=180980.5 seconds is shown in terms of the correlator taps in FIG. 2A. As shown, the correlation is quite good, with the peak appropriately located around the location of the SV signal (tap #0). In FIG. 2A, the CNO is 27.3 and the Window CNO is 21.8.

However, at TOW=180985.5 seconds, as shown by FIG. 2B, the correlation amplitude 210B indicates that the correlation of the SV16 signal starting to be lost by receiver #70. The lack of correlation is also indicated by the change in scale: while FIG. 2A went from 0 to 3500 on the y-axis, FIG. 2B only goes from 0 to 1400. In other words, correlation amplitude 210B in FIG. 2B remains roughly in the same range as correlation amplitude 210A in FIG. A before the SV signal peak—i.e., what is being received by receiver #70 of the SV signal is indistinguishable from noise. In FIG. 2B, the CNO is 18.5 and the Window CNO is 2.6, providing a much better indication regarding the probable loss of sufficient signal power.

As shown in FIG. 2C, at TOW=180989.5 seconds, the correlation amplitude 210C indicates the start of a two second period of good correlation of the SV16 signal by receiver #70 (as shown in FIG. 1). Although the scale of FIG. 2C (0 to 2000 on the y-axis) is still less than FIG. 2A (0 to 3500 on the y-axis), the change in magnitude of the taps around tap #0 in FIG. 2C indicates the beginning of good correlation. In FIG. 2C, the CNO is 18.2 and the Window CNO is 14.6.

Figure 2D:
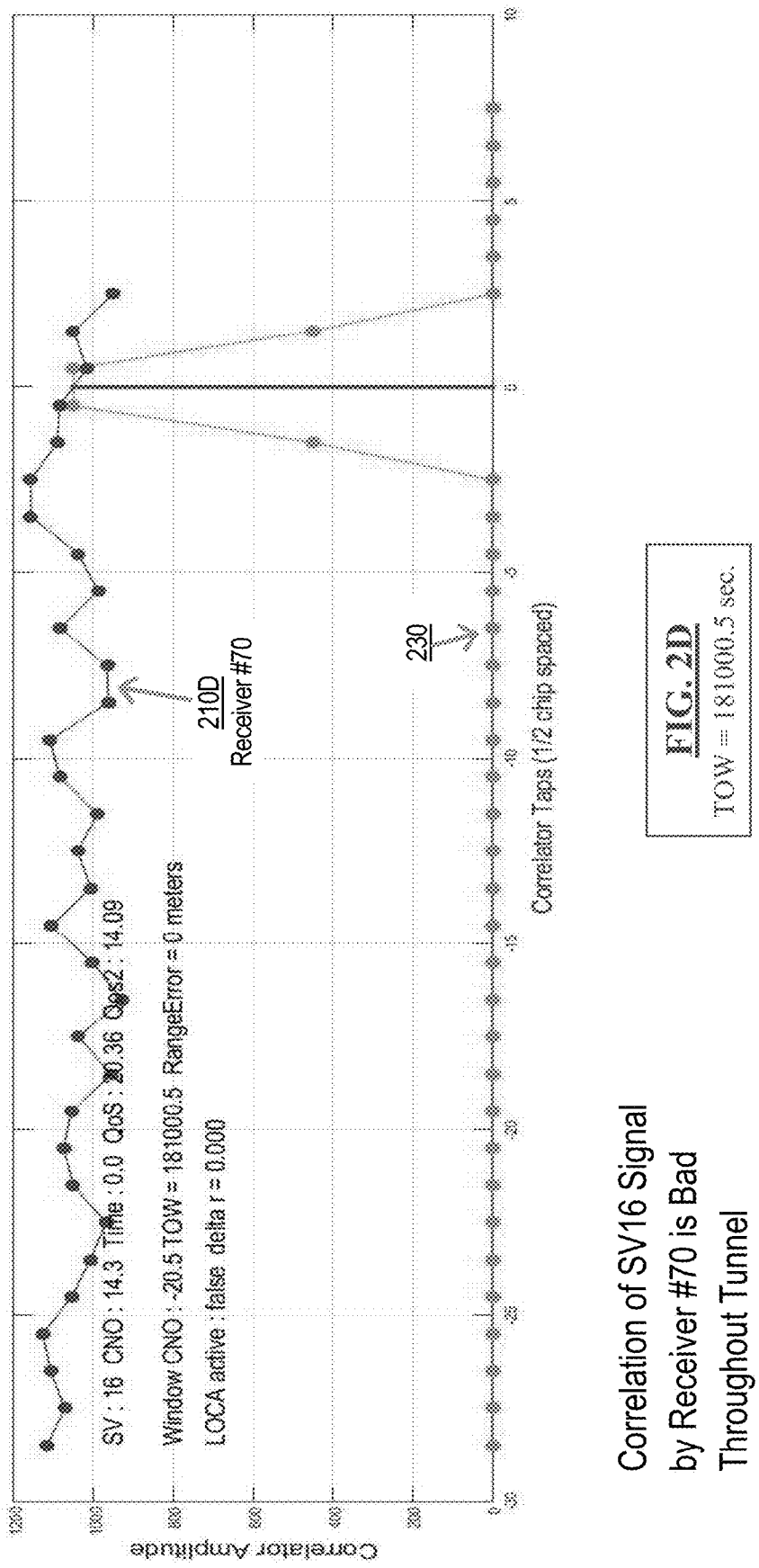

FIG. 2D is inside the tunnel. More specifically, FIG. 2D shows the correlation amplitude 210D of the SV16 signal at TOW=181000.5 seconds by receiver #70. As expected, correlation amplitude 210D is quite bad. Considering that the scale of FIG. 2D (0 to 1200 on the y-axis) is even less than FIG. 2B (0 to 1400), correlation amplitude 210D in FIG. 2D is even more indistinguishable from noise than correlation amplitude 210B in FIG. 2B, and has one peak that is clearly higher than the correlation amplitude 210D at tap #0. In FIG. 2D, the CNO is 14.3 and the Window CNO is −20.5, providing a clear indication of the loss of sufficient signal power.

In FIG. 2E, the receivers are reaching the exit of the tunnel. More specifically, FIG. 2E shows the correlation amplitude 210E of the SV16 signal at TOW=181026.5 seconds by receiver #70. While correlation amplitude 210E of the SV16 signal for receiver #70 is getting much better than when in the middle of the tunnel, the early and late taps are unbalanced, resulting in a peak not matching tap #0, as shown in FIG. 2E. In FIG. 2E, the CNO is 12.1 and the Window CNO is 11.0.

FIG. 2F is a moment of time where the receivers are long outside the tunnel and, in fact, is not on the graph of FIG. 1. More specifically, FIG. 2F shows the correlation amplitude 210F of the SV16 signal at TOW=181245.5 seconds by receiver #70. In FIG. 2F, the CNO is 18.8 and the Window CNO is 12.8.

The measurements of standard "CNO" vs. "Window CNO" in FIGS. 2A through 2F show the possible great advantages provided by the use of windowing.

Accordingly, according to various embodiments of the present disclosure, a windowing measurement of correlation energy error along with a knowledge of tracking loop bandwidths and the use of a threshold for correlation energy error are used to more accurately identify and mitigate signal nulls. The received GNSS signal energy is measured in such a way as to provide timely information with respect to possible signal drift and the consequent errors in measurements and navigation solutions. A new short term estimate of whether there is enough signal to noise ratio (SNR) present to successfully drive the tracking loops in the right direction (i.e., maintaining substantial alignment with the incoming satellite) is used to shape and/or eliminate questionable measurements.

According to one embodiment of the present disclosure, a lost signal energy parameter En, different from the standard carrier to noise density power ratio ($C/N_0$) measurement indicators used by many GNSS receivers, is calculated over a moving window. This lost signal energy parameter $E_{SL}$ is compared with a previously determined threshold $Th_{SL}$ in order to determine and provide an indication whether the GNSS measurements are potentially bad. A number of actions may be taken based on this indication. For example, besides discarding the GNSS measurements and/or tracking of the satellite producing the possibly bad GNSS measurements, the indication may be used by the navigation engine to de-weight those possibly bad GNSS measurements.

Although, $E_{SL}$ and $Th_{SL}$ are used conveniently for general reference, it would be understood by one of ordinary skill in the art that these parameters could be more accurately denoted $E_{SL_i}$ and $Th_{SL_i}$ as these values would exist for each satellite i in view. Moreover, $Th_{SL_i}$ may be continually changing (within certain parameters), as discussed further below.

Moreover, an estimate of measurement error growth can be formed over time by using the $E_{SL}$ vs. $Th_{SL}$ comparison which helps to understand the potential track loop drift in the presence of noise only and any potential change in user dynamics (i.e., the effect of user motion on the tracking loops). This places a bound on the measurement error over time that can be used as an additional means by the navigation engine to weight/de-weight a particular satellite's measurement. In such embodiments, the measurement error growth estimate would be initially set at 0, and when $E_{SL}<Th_{SL}$, the measurement growth estimate would start to increase in value. At each iteration when $E_{SL}<Th_{SL}$, the measurement growth estimate would increase in value. Similarly, at each iteration when $E_{SL}>Th_{SL}$, the measurement growth estimate would decrease in value.

Using the $E_{SL}$ vs. $Th_{SL}$ comparison as an indicator of signal trends, the satellite tracking mechanism may effectively flywheel through shorts periods (seconds) of signal loss. Fly wheeling occurs when the GNSS receiver recognizes that the signal is not present and lets the tracking update phase, frequency, and frequency rate values update automatically based on the last known good values, when the signal was present. In this manner, the GNSS receiver can maintain substantial alignment with the satellite signal, assuming that the changes of the values being tracked were not substantial during the period of flywheeling.

The measurement growth estimate according to embodiments of the present disclosure can be applied to either or both range and delta range measurements.

Figure 3:
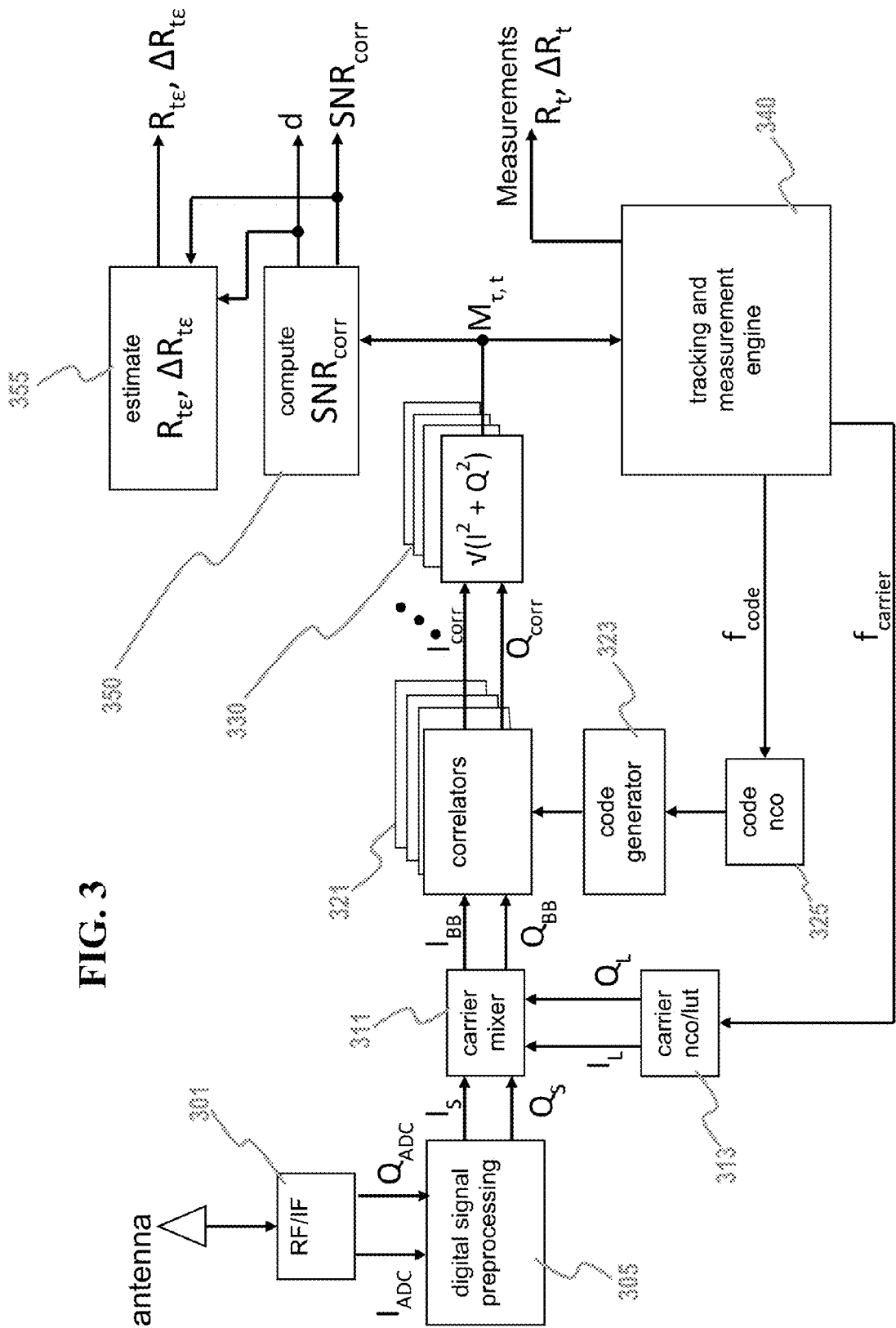
FIG. 3 is a block diagram of a GNSS receiver according to an embodiment of the present disclosure.

FIG. 3 is a block diagram of a GNSS receiver according to an embodiment of the present disclosure.

In FIG. 3, the GNSS signals received by the antenna are processed by the radiofrequency (RF)/intermediate frequency (IF) block 301, which amplifies, filters, and digitizes the signals, producing $I_{ADC}$ and $Q_{ADC}$ (the components of the digitally converted signals), which are fed to digital signal preprocessing block 305. Digital signal preprocessing block 305 detects and removes interfering signals and separates the GNSS signals into their individual systems. For example, the GPS signals would be separated from the GLONASS signals.

Signals $I_S$ and $Q_S$ output from digital signal preprocessing block 305 are input into carrier mixer 311, which translates signals $I_S$ and $Q_S$ to baseband signals $I_{BB}$ and $Q_{BB}$ by mixing $I_S$ and $Q_S$ with signals $I_L$ and $Q_L$ output from carrier frequency numerically-controlled oscillator (NCO)/look-up table (LUT) block 313. Carrier NCO/LUT block 313 is fed by frequency $f_{carrier}$ in order to align the incoming satellite signals with the locally-generated carrier frequency. As would be understood by one of ordinary skill in the art, signal tracking algorithms (typically implemented in software) form a carrier frequency tracking discriminator from the correlations and apply a loop filter before feeding back the frequency estimate $f_{carrier}$ to Carrier NCO/LUT 313.

The baseband signals $I_{BB}$ and $Q_{BB}$ output from carrier mixer 311 are input into correlators 321, which correlate $I_{BB}$ and $Q_{BB}$ with individual satellite codes which are fed from code generator 323, thereby outputting sets of correlated signals $I_{corr}$ and $Q_{corr}$. Code generator 323 is driven by code NCO 325, which itself is fed code shift estimate $f_{code}$. Similar to the carrier frequency tracking above, and as would be understood by one of ordinary skill in the art, code correlating/tracking algorithms (typically implemented in software) form a code tracking discriminator function that is further filtered to generate feedback code phase shift estimate $f_{code}$ to code NCO 325.

The correlated signals $I_{corr}$ and $Q_{corr}$ output from correlators 321 are input into integrator 330, which calculates $\sqrt{I^2+Q^2}$, thereby generating $M_{\tau,t}$, the absolute magnitude of the signal with chip delay $\tau$ and time t. $M_{\tau,t}$ is input into tracking and measurement engine 340 which uses the input (and the various feedback loops) to generate range measurement $R_t$ (based on the code phase) and range rate measurement $\Delta R_t$ (based on the carrier frequency/phase). The navigation engine uses measurements $R_1$ and $\Delta R_t$ generated by tracking and measurement engine 340 to compute the GNSS receiver's position, velocity, and/or time (PVT).

During normal functioning, the GNSS receiver keeps the local code phase and carrier frequency estimates ($R_t$, $\Delta R_t$) substantially aligned with the received satellite signals (on a satellite-by-satellite basis). However, when in a null zone where, for example, very weak and/or very few satellite signals are present, the GNSS receiver's estimate of alignment ($R_t$, $\Delta R_t$) no longer represents an accurate estimate of the relative satellite(s)/user PVT.

The GNSS receiver in FIG. 3 detects when these correlations/alignments start to diverge from accurate alignment by use and allows the navigation engine to make a decision as to how, for example, to weight a particular satellite's measurements in the overall navigation solution. In this embodiment, this is done by computing a parameter $SNR_{corr}$ that represents a short term estimate of whether there is enough SNR present to successfully drive the tracking loops in the right direction (i.e., maintaining substantial alignment with the incoming satellite signals). A specific calculation of $SNR_{corr}$ according to one embodiment of the present disclosure is discussed further below.

In FIG. 3, block 350 takes $M_{\tau,t}$ as input, from which $SNR_{corr}$ and d are calculated and output. In this embodiment, this is done for multiple measurements per second, every second, as will be discussed in further detail below. Signal d is set true (1) or false (0) based on whether or not $SNR_{corr}$ is less than the predetermined threshold $Th_{SL}$. Thus, d=false means that there is enough $SNR_{corr}$ present for the tracking loops to substantially maintain signal alignment and d=true means that there is not enough $SNR_{corr}$ present for the tracking loops to substantially maintain signal alignment.

As would be understood by one of ordinary skill in the art, $Th_{SL}$ is the probability of a false alarm/reading in a certain number of readings (e.g., 1 in 10,000). This threshold would depend on a number of factors, including the period of integration and would most likely be pre-calculated and stored in a LUT according to the various factors in the GNSS receiver when manufactured.

Block 355 in FIG. 3 takes the $SNR_{corr}$ and d generated by block 350 and estimates the range measurement error $R_{re}$ (based on the code phase) and range rate measurement error $\Delta R_{re}$ (based on the carrier frequency/phase). These are nominally in units of meters and meters per second, respectively. In this embodiment, the measurement errors are estimated based on the time history of the $SNR_{corr}$ values. For example, if d has been set true for 1 second, then the estimated $R_{re}$ error may be 10 meters; if d has been set true for the last 2 seconds, the estimated $R_{re}$ error may be 20 meters; and so on. Similarly, the time over which d has been set true vs. the expected error boundary is maintained for $\Delta R_{re}$.

Figure 4:
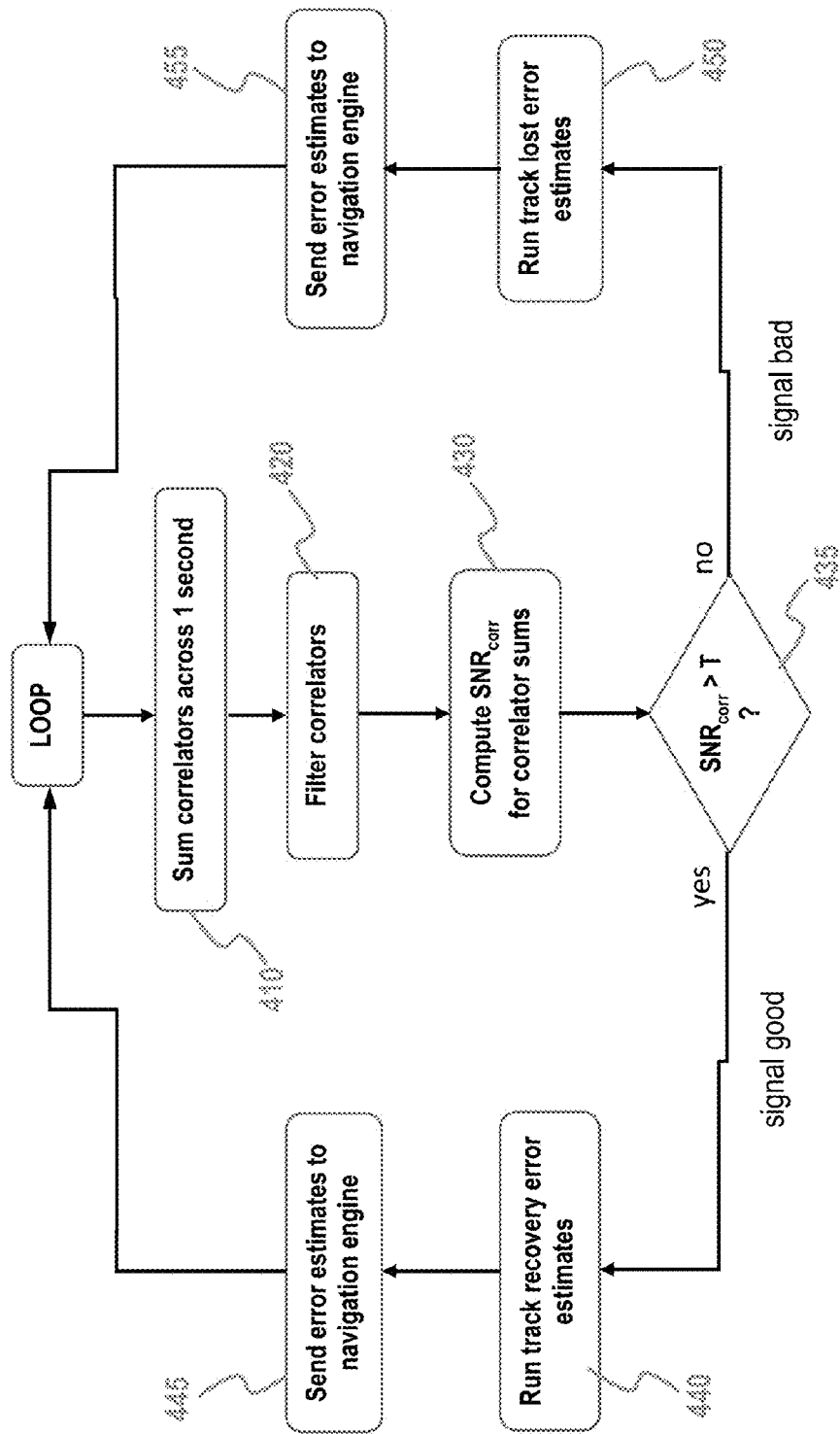
FIG. 4 is a flowchart of a specific method for computing and using $SNR_{corr}$ values according to an embodiment of the present disclosure.

FIG. 4 is a flowchart of a specific method for computing and using $SNR_{corr}$ values according to an embodiment of the present disclosure.

At 410, the correlator output values for I and Q are integrated over a 20 msec period ($\sqrt{I_{20msec}^2 + Q_{20msec}^2}$), and then the 20 msec values are summed over a full second (i.e., 20 msec×50=1 second), as shown in Equation (1) below:

$$C_{sum} = \Sigma_{j=1}^{50} \sqrt{I_j^2 + Q_j^2} \quad (1)$$

$C_{sum}$ values are computed for each of the punctual and noise/offset correlators. According to the present disclosure, a noise estimate is formed via offset correlations, which are unlikely to be impaired by multipath during tracking. Offset/noise correlations will be explained in more detail in reference to FIG. 5.

Figure 5:
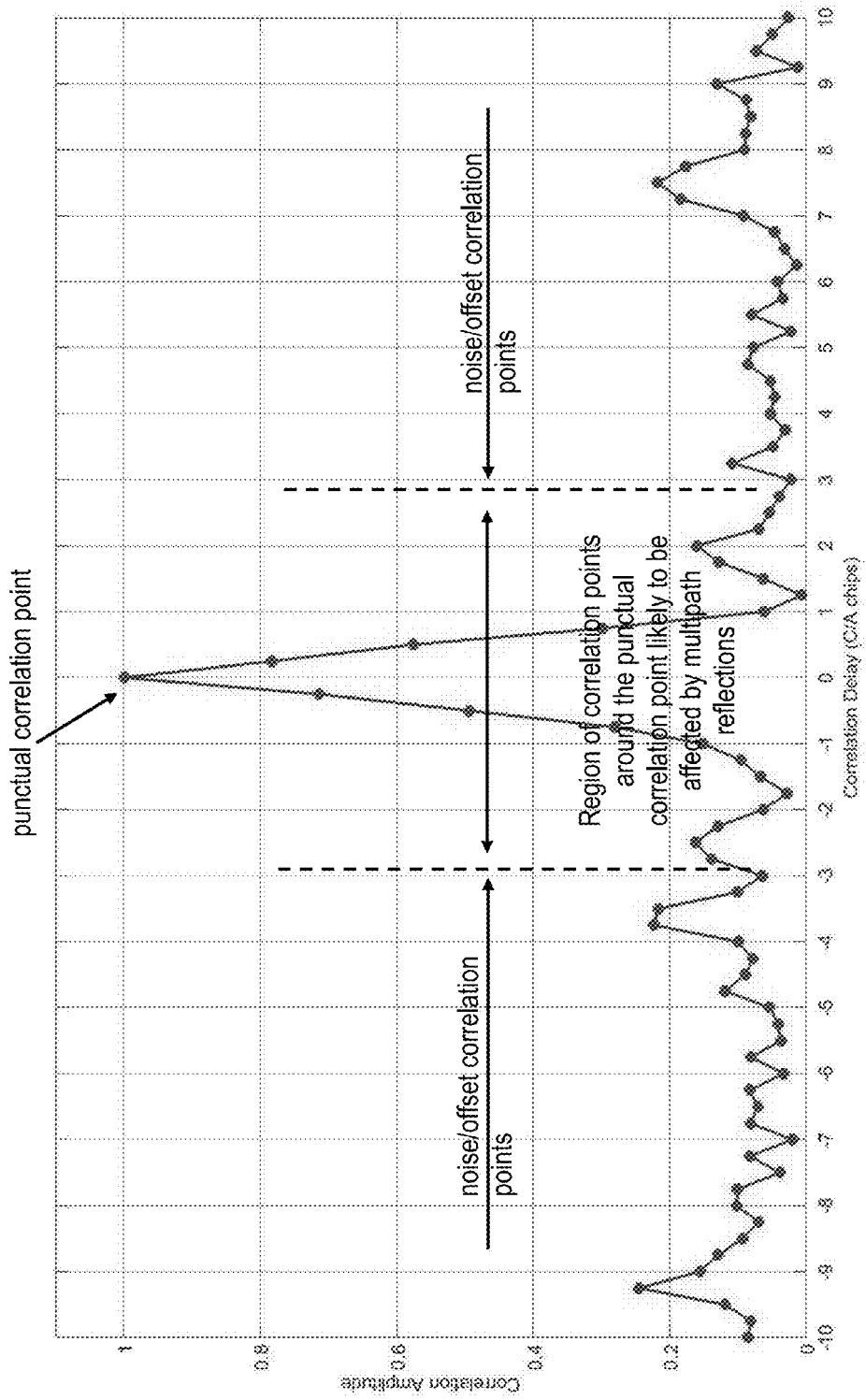
FIG. 5 is a graph of discrete correlation measurements illustrating an example of noise/offset correlations according to an embodiment of the present disclosure.

FIG. 5 is a graph showing discrete correlation values computed at every ¼ chip (e.g., between 0 and −1 are 4 measurements). The punctual correlation point, the 0 point with the strongest correlation, is located at the center. The offset correlations are defined in relation to the punctual correlation point. In FIG. 5, the region of offset correlation points is outside of the dotted lines. More specifically, the offset correlations are those which are outside the region approximately ±3 chips from the punctual correlation point. In GPS, a chip/delay represents roughly 300 meters, and thus ±3 chips represents ≈±900 meters. Because no multipath reflection is expected to have a delay more than 900 meters from the direct signal path, the offset correlations beyond ±3 chips are most likely to be simply noise.

Returning to FIG. 4, at 420, the one second $C_{sum}$s are further filtered by calculating filtered_correlator(t), which provides further noise reduction, as shown by Equation (2) below:

$$\text{filtered\_correlator}_i(t) = [(1-\alpha) \times \text{filtered\_correlator}_i(t-1)] + [\alpha \times C_{sum\_i}(t)] \quad (2)$$

where α is a filter constant, as would be understood by one of ordinary skill in the art. Typical filtering would take a few seconds.

At 430, $SNR_{corr}$ is calculated, using Equation (3) below:

$$SNR_{corr} = \frac{S_{corr}}{N_{corr}} = \frac{\text{filtered\_correlator}_{punctual}(t)}{\frac{1}{k}\sum_{i=1}^{k} C_{sum\_noise}(i)} \quad (3)$$

where:
filtered_correlator$_{punctual}$(t) is the filtered version of the punctual correlator (i.e., the correlator at 0 in FIG. 5);
$C_{sum\_noise}(i)$ is the $C_{sum}$ for noise correlator i;
k is the number of noise correlators; and, accordingly, $$\frac{1}{k}\sum_{i=1}^{k} C_{sum\_noise}(i) \text{ is the average correlated noise.}$$

The greater k is, i.e., the greater the number of noise/offset correlators which are averaged over is, the less variance there will be in $SNR_{corr}$. Although $SNR_{corr}$ can be converted into $C/N_0$ dB-Hz units, such a step is not required as it is only used as a threshold (or SNR range).

At 435, it is determined whether $SNR_{corr}$ is greater than the threshold T.

If $SNR_{corr}$>T is true (YES) at 435, the measurement error growth is either zero or ramping down from some previous $SNR_{corr}$<T state. The measurement error growth based on the time history of $SNR_{corr}$ and the predetermined error bounds are used to run track recovery error estimates at 440. For example, the measurement error growth will be zero if there is no recent history of $SNR_{corr}$<T being true. These track recovery error estimates are sent to the navigation engine at 445.

If $SNR_{corr}$>T is false (NO) at 435, the measurement error growth based on the time history of $SNR_{corr}$ and the predetermined error bounds are used to run track lost error estimates at 450, assuming that a further ramp of errors while $SNR_{corr}$<T continues to be true. These track recovery error estimates are sent to the navigation engine at 455.

Figure 6:
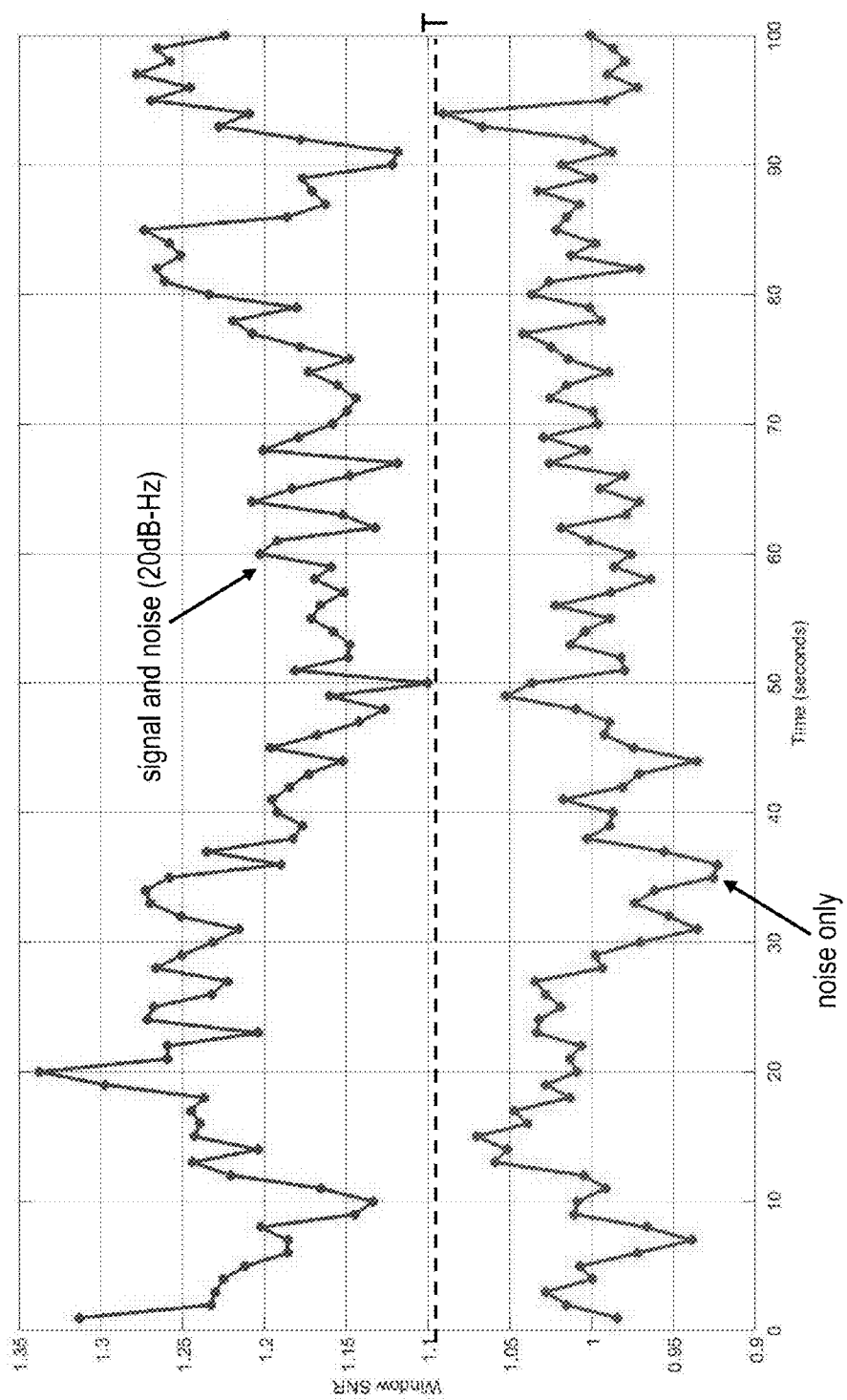
FIG. 6 is a graph showing example plots of the $SNR_{corr}$ of noise alone (no signal present), the $SNR_{corr}$ of both signal and noise, and the threshold T, according to an embodiment of the present disclosure.

FIG. 6 is a graph of $SNR_{corr}$ over time (in seconds), showing example plot of $SNR_{corr}$ of noise alone (no signal present) on the bottom, and an example plot of $SNR_{corr}$ of both signal and noise on the top, where the threshold T is shown as a dotted line.

Depending on the embodiment of the present disclosure, steps and/or operations in accordance with the present disclosure may occur in a different order, or in parallel, or concurrently for different epochs, etc., in different embodiments, as would be understood by one of ordinary skill in the art. As would be understood by one of ordinary skill in the art, FIG. 4 is a simplified representation of the actions performed, their descriptions a simplified overview, and real-world implementations would be much more complex, require more stages and/or components, and would also vary depending on the requirements of the particular implementation. Different embodiments may perform actions in a different order or by different ways or means. Being simplified representations, FIG. 4 does not show other required steps as these are known and understood by one of ordinary skill in the art and not pertinent and/or helpful to the present description. Similarly, FIG. 3 is a simplified block diagram showing only pertinent components, and some of these components merely represent a function rather than an actual piece of hardware, as would be understood by one of ordinary skill in the art.

Depending on the embodiment of the present disclosure, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include, but are not limited to, laptops, tablet computers, Portable Digital Assistants (PDAs), mp3 players, handheld PCs, Instant Messaging Devices (IMD), cellular telephones, Global Navigational Satellite System (GNSS) receivers, watches, cameras or any such device which can be worn and/or carried on one's person. "User Equipment" or "UE" as used herein corresponds to the usage of that term in the 3GPP LTE/LTE-A protocols, but is not in any way limited by the 3GPP LTE/LTE-A protocols. Moreover, "User Equipment" or "UE" refers to any type of device, including portable devices, which acts as a wireless receiver.

Depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof. Moreover, the functionality of any "block" discussed herein may be implemented in software, firmware, hardware, and/or any combination thereof.

As an example, various embodiments of the present disclosure could be implemented in a broadband modem chip, as would be understood by one of ordinary skill in the art, in view of the present disclosure.

The one or more non-transitory computer-readable media and/or means for implementing/performing one or more operations/steps/modules of embodiments of the present disclosure may include, without limitation, application-specific integrated circuits ("ASICs"), standard integrated circuits, controllers executing appropriate instructions (including microcontrollers and/or embedded controllers), field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While certain embodiments of the disclosure have been shown and described herein it will be understood by those skilled in the art that various changes in form and detail may be made without departing from the spirit and scope of the disclosure as defined by the appended claims.

What is claimed is:

1. A method for a Global Navigation Satellite System (GNSS) receiver, comprising:
    calculating a filtered value of an integrated and summed correlator value for a punctual correlator of a satellite signal ("the calculated filtered punctual correlator value");
    calculating an average of integrated and summed correlator values for a plurality of noise/offset correlators of the satellite signal ("the calculated average noise/offset correlator value");
    calculating a signal energy loss parameter $E_{SL}$ of the satellite signal using the calculated filtered punctual correlator value and the calculated average noise/offset correlator value; and
    processing the satellite signal measurement based at least on the signal energy loss parameter $E_{SL}$ and a predetermined threshold $Th_{SL}$ presently corresponding to the punctual and noise/offset correlators of the satellite signal.

2. The method of claim 1, wherein the plurality of noise/offset correlators exclude any correlators which are within a preset chip distance from the punctual correlator.

3. The method of claim 2, wherein the preset chip distance is determined based on multipath fading.

4. The method of claim 1, wherein calculating the energy loss parameter $E_{SL}$ of the satellite signal comprises:
    calculating $SNR_{corr}$ by dividing the calculated filtered punctual correlator value by the calculated average noise/offset correlator value.

5. The method of claim 1, wherein processing the satellite signal measurement is based at least on comparing the signal energy loss parameter $E_{SL}$ and the predetermined threshold $Th_{SL}$.

6. The method of claim 5, wherein processing the satellite signal measurement is also based at least on a history of comparing the signal energy loss parameter $E_{SL}$ and the predetermined threshold $Th_{SL}$.

7. The method of claim 6, wherein processing the satellite signal measurement comprises:
    weighting the satellite signal measurement based at least on the current comparison of the signal energy loss parameter $E_{SL}$ and the predetermined threshold $Th_{SL}$ and the history of comparing the signal energy loss parameter $E_{SL}$ and the predetermined threshold $Th_{SL}$.

8. The method of claim 1, wherein calculating the filtered punctual correlator value comprises:
   integrating the I and Q values of the punctual correlator over each first period of time;
   summing the integrated punctual correlator values over a second period of time; and
   filtering the sum of the integrated punctual correlator values over the second period of time.

9. The method of claim 8, wherein the sum of integrated punctual correlator values is $C_{sum\_punctual}(t)$ and wherein filtering the sum of the integrated punctual correlator values over the second period of time comprises performing:

$$\text{filtered\_correlator}_{punctual}(t)=[(1-\alpha)\times \text{filtered\_correlator}_{punctual}(t-1)]+[\alpha\times C_{sum\_punctual}(t)],$$

where $\alpha$ is a filter constant.

10. The method of claim 1, wherein calculating the average noise/offset correlator value comprises:
   integrating the I and Q values of each noise/offset correlator over each first period of time;
   summing the integrated noise/offset correlator values over a second period of time; and
   averaging the sum of the integrated noise/offset correlator values over a number of noise/offset correlators.

11. The method of claim 10, wherein averaging the sum of the integrated noise/offset correlator values over a number of noise/offset correlators comprises performing:

$$\frac{1}{k}\sum_{i=1}^{k}C_{sum\_noise}(i),$$

where k is the number of offset/noise correlators; and
$C_{sum\_noise}(i)$ is the sum of integrated noise/offset values over the second period of time for offset/noise correlator i.

12. A Global Navigation Satellite System (GNSS) receiver, comprising:
   a plurality of correlators;
   at least one non-transitory computer-readable medium; and
   at least one processor, which, when executing instructions stored on one or more of the at least one non-transitory computer-readable medium, has the GNSS receiver perform at least the following steps:
      calculating a filtered value of an integrated and summed correlator value for a punctual correlator of a satellite signal ("the calculated filtered punctual correlator value");
      calculating an average of integrated and summed correlator values for a plurality of noise/offset correlators of the satellite signal ("the calculated average noise/offset correlator value");
      calculating a signal energy loss parameter $E_{SL}$ of the satellite signal using the calculated filtered punctual correlator value and the calculated average noise/offset correlator value; and
      processing the satellite signal measurement based at least on the signal energy loss parameter $E_{SL}$ and a predetermined threshold $Th_{SL}$ presently corresponding to the punctual and noise/offset correlators of the satellite signal.

13. The GNSS receiver of claim 12, wherein calculating the energy loss parameter $E_{SL}$ of the satellite signal comprises:
   calculating $SNR_{corr}$ by dividing the calculated filtered punctual correlator value by the calculated average noise/offset correlator value.

14. The GNSS receiver of claim 12, wherein processing the satellite signal measurement is based at least on comparing the signal energy loss parameter $E_{SL}$ and the predetermined threshold $Th_{SL}$.

15. The GNSS receiver of claim 14, wherein processing the satellite signal measurement is also based at least on a history of comparing the signal energy loss parameter $E_{SL}$ and the predetermined threshold $Th_{SL}$.

16. The GNSS receiver of claim 15, wherein processing the satellite signal measurement comprises:
   weighting the satellite signal measurement based at least on the current comparison of the signal energy loss parameter $E_{SL}$ and the predetermined threshold $Th_{SL}$ and the history of comparing the signal energy loss parameter $E_{SL}$ and the predetermined threshold $Th_{SL}$.

17. A modem chip capable of processing Global Navigation Satellite System (GNSS) signals, comprising:
   a plurality of correlators;
   at least one non-transitory computer-readable medium; and
   at least one processor, which, when executing instructions stored on one or more of the at least one non-transitory computer-readable medium, has the modem chip perform at least the following steps:
      calculating a filtered value of an integrated and summed correlator value for a punctual correlator of a satellite signal ("the calculated filtered punctual correlator value");
      calculating an average of integrated and summed correlator values for a plurality of noise/offset correlators of the satellite signal ("the calculated average noise/offset correlator value");
      calculating a signal energy loss parameter $E_{SL}$ of the satellite signal using the calculated filtered punctual correlator value and the calculated average noise/offset correlator value; and
      processing the satellite signal measurement based at least on the signal energy loss parameter $E_{SL}$ and a predetermined threshold $Th_{SL}$ presently corresponding to the punctual and noise/offset correlators of the satellite signal.

18. The modem chip of claim 12, wherein calculating the energy loss parameter $E_{SL}$ of the satellite signal comprises:
   calculating $SNR_{corr}$ by dividing the calculated filtered punctual correlator value by the calculated average noise/offset correlator value.

19. The modem chip of claim 18, wherein processing the satellite signal measurement is based at least on comparing the signal energy loss parameter $E_{SL}$ and the predetermined threshold $Th_{SL}$.

20. The modem chip of claim 19, wherein processing the satellite signal measurement is also based at least on a history of comparing the signal energy loss parameter $E_{SL}$ and the predetermined threshold $Th_{SL}$.

* * * * *